United States Patent [19]

Bourguignat et al.

[11] Patent Number: 4,983,015

[45] Date of Patent: Jan. 8, 1991

[54] SYSTEM FOR THE DISPLAY OF COLOR IMAGES USING AN OPTICAL MIXER WITH FIBERS IN ORDERED ARRANGEMENT

[75] Inventors: Jerome Bourguignat, Merignac; Jean-Blaise Migozzi, Orsay, both of France

[73] Assignee: Thomson CSF, Puteaux, France

[21] Appl. No.: 373,048

[22] Filed: Jun. 29, 1989

[30] Foreign Application Priority Data

Jul. 8, 1988 [FR] France .................. 88 09304

[51] Int. Cl.$^5$ .................................................. G02B 6/06
[52] U.S. Cl. .......................... 350/96.25; 350/96.24; 350/96.27
[58] Field of Search .............. 350/96.24, 96.25, 96.26, 350/96.27

[56] References Cited

U.S. PATENT DOCUMENTS

| | | | |
|---|---|---|---|
| 3,247,755 | 4/1966 | Siegmund | 350/96.25 |
| 3,964,289 | 6/1976 | Yevick | 350/96.25 |
| 4,101,188 | 7/1978 | Yevick | 350/96.25 |
| 4,253,447 | 3/1981 | Moore et al. | 350/96.26 X |
| 4,871,228 | 10/1989 | Roos | 350/96.24 X |

Primary Examiner—John D. Lee
Assistant Examiner—Phan T. Heartney
Attorney, Agent, or Firm—Cushman, Darby & Cushman

[57] ABSTRACT

The optical mixer disclosed enables, through optic fibers, a precise superimposition, in a plane of observation, of identical elementary images with distinct chrominance values. It comprises n (n being a whole number greater than 1) display devices to form n monochrome elementary images with different chrominance values on n screens using one and the same original image, and an optical mixing device formed by optic fibers which may be arranged in sheets. These sheets are ordered to form groups of n fibers wherein the fibers of one and the same group terminate, at their first end, respectively at the n screens, in dots of the elementary images corresponding to the same dot of the original image and terminate, at their second end, in the plane of observation, substantially in a dot corresponding to the dot considered, for the group of the original image.

7 Claims, 5 Drawing Sheets

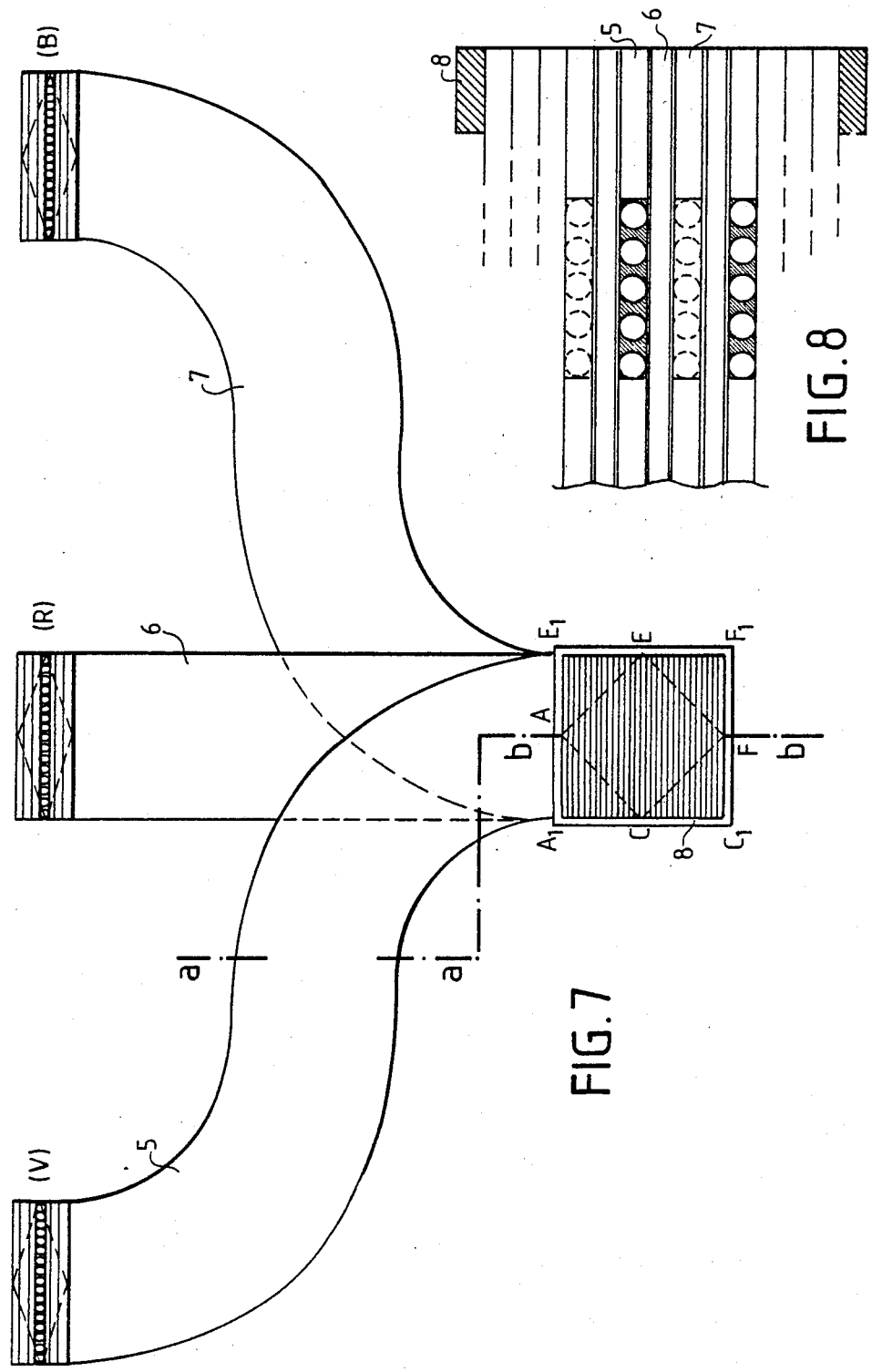

SYSTEM FOR THE DISPLAY OF COLOR IMAGES USING AN OPTICAL MIXER WITH FIBERS IN ORDERED ARRANGEMENT

BACKGROUND OF THE INVENTION

1. Field of the Invention

The present invention concerns a system for the display of color pictures or images using an optical mixer with fibers in ordered arrangement.

To prepare very high definition color images, three monochrome cathode ray tubes with high definition can be used, each producing the image to be displayed in one of the three fundamental colors red (R), green (V) or blue (B). A problem then rises in optically superimposing the images, that are produced with different chrominance values, with adequate precision.

A prior art approach consists in using partially reflective strips or dichroic strips. The major difficulties encountered concern the precise superimposition of the dots corresponding to each image, for the alignment proves to be difficult to achieve.

SUMMARY OF THE INVENTION

The aim of the invention is to cope with these difficulties in using bundles of ordered optical fibers.

According to the present invention, there is provided a system for the display of color images comprising: n display devices, where n is a whole number greater than 1, respectively provided with n electronic scanning screens to form, from one and the same original image, n monochrome elementary images with n distinct chrominance values, respectively on the n screens, and an optical mixing device to mix the n elementary images and form a resultant color image in a plane of observation, said mixing device being formed by optical fibers having a first end and a second end and being ordered to form groups of n fibers, the fibers of one and the same group terminating, at their first end, respectively at the n screens in dots of the elementary images corresponding to one and the same image dot and terminating, at their second end, in the plane of observation, substantially in a dot which is the dot of the resultant image to be displayed, corresponding to the dot considered, for the group of the original image.

BRIEF DESCRIPTION OF THE DRAWINGS

The special features and advantages of the invention will appear from the following description, made with reference to the appended figures, of which:

FIGS. 7 and 8 are drawings pertaining to an assembly of the optical mixer using three networks of sheets interlaced at one end to form the resultant plane color image;

DETAILED DESCRIPTION OF THE PREFERRED EMBODIMENTS

Figure 1:
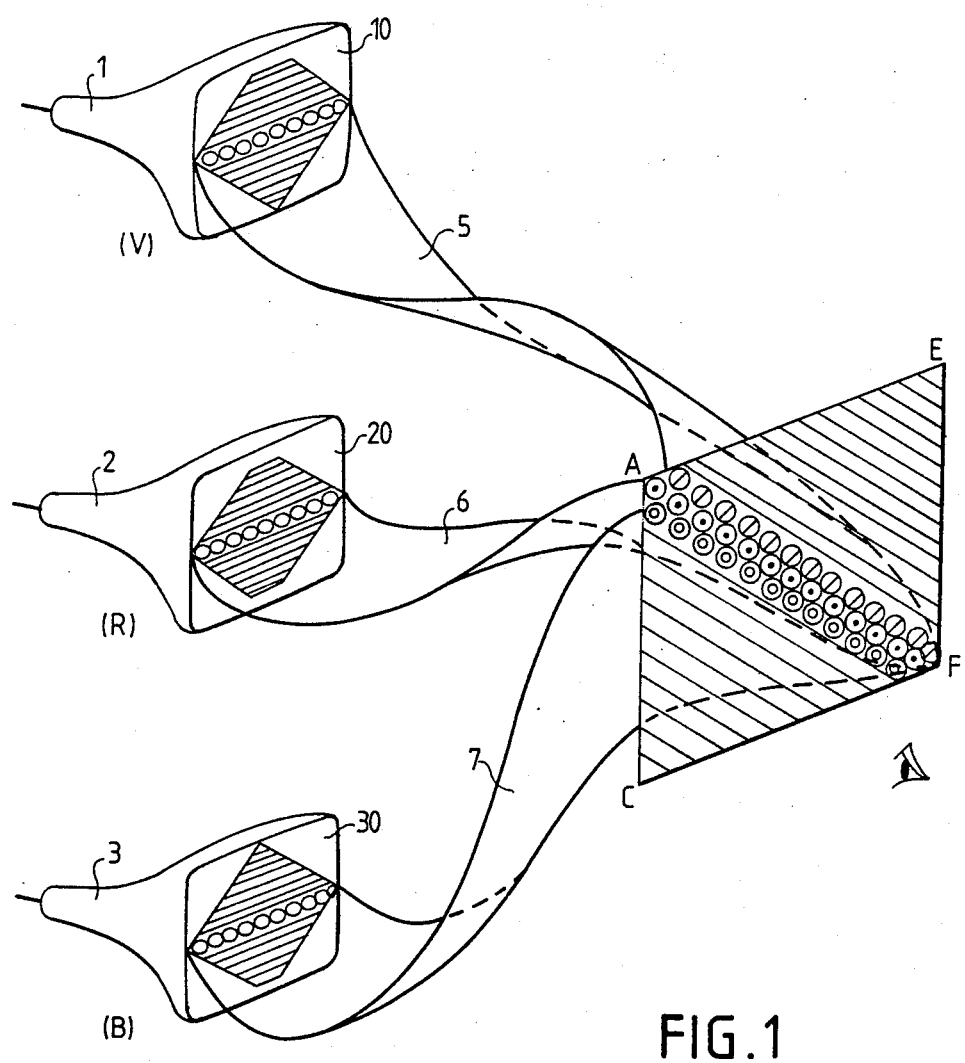
FIG. 1 shows a simplified view of the optical mixing method used according to the invention.

Referring to FIG. 1, it is possible to distinguish three image display devices, for example cathode ray tubes 1, 2 and 3, respectively used to produce an image with a given chrominance value which is different for each of them. In this example with three tubes, the chrominance values correspond to the fundamental shades red R, green V and blue B. This example, however, should not be considered to be restrictive for the invention also applies, although to a lesser degree, to the mixture of only two chrominance values prepared on the basis of two display devices.

The optical mixing device used to mix the three elementary monochrome images and to form a resultant color image in an observation plane demarcated by a standard rectangular area AECF is formed by bundles of ordered optical fibers made in the form of plane parallel sheets juxtaposed in the plane of observation at a first of their ends. Each sheet corresponds to an arrangement, in the plane of the sheet, of parallel optical fibers spaced out at a determined pitch and forming a row of dots at each end. The second end of the sheets is arranged in the same way in distributing them so as to be facing and to be near the screens 10, 20 and 30 of the respective cathode ray tubes to pick up the corresponding R, V and B displayed images. To simplify the figure, we have shown only one sheet starting from each tube, as it happens a central sheet respectively marked 5, 6 and 7. At their first ends, these sheets end in the observation plane where they are arranged in being inclined with respect to the sides of the rectangle AECF.

In principle, to simplify the explanation, it is assumed that the figure AECF is a square. The sheets are arranged in parallel to one of the diagonals, for example the diagonal AF with the direction D1. In the square AECF, a sheet R, a sheet V and a sheet B and so on are placed successively.

Figure 3:
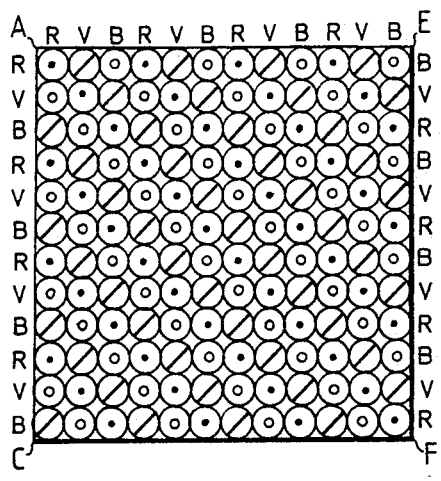
FIG. 3 shows the same arrangement of fibers in distinguishing the chrominance values R, V and B.
Figure 4:
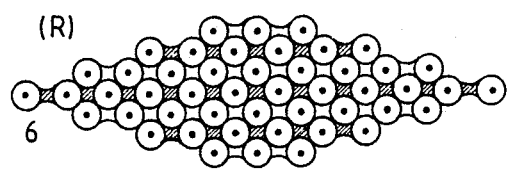
FIGS. 4, 5 and 6 show the arrangements of fibers respectively corresponding to he transmission of the chrominance value R, V, and B at the other end of sheets, on the display screens side of the elementary images R, V and B.

This arrangement is shown in detail in FIG. 3 with an indication of the respective RVB chrominance values. FIG. 3 shows the sequence of sheets N1, N2, etc. and their geometric layout in the square shape. The fibers of the superimposed sheets are spaced out, along the direction D2 of the diagonal CE, at a pitch equal to $D/\sqrt{2}$, D being the diameter of the fibers. The fibers are at a pitch of $DV2$ in the other diagonal direction D1. The dimension of the square has the value $L=ND$ demarcating an overall image of N lines each having N dots resulting from N fibers with a diameter D. The red sheets R are selected and grouped together at their opposite end facing the screen 20 according to the depiction of FIG. 4.

Figure 5:
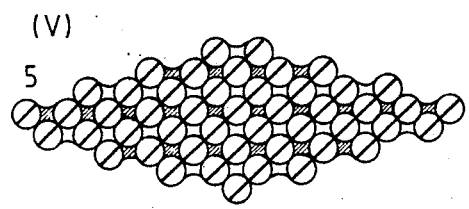
Figure 6:
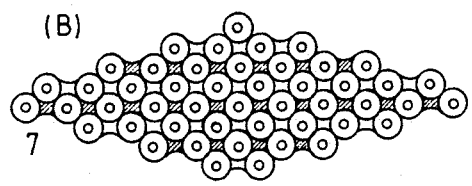

FIGS. 5 and 6 similarly correspond to groupings, at their other end, of green sheets V and blue sheets B in front of the respective screens 10 and 30.

In general, if the order of a sheet of a given chrominance value is called "j", it is subsequently placed on the side of the color image displayed in the plane AECF at the order j+3, j+6, etc. The order j+1, j+4, j+7 sheets correspond to a second chrominance value and the order j+2, j+5, j+8 sheets correspond to the third chrominance value.

It is seen, from FIGS. 3 to 6, that the number of fibers used per sheet, as and when we move away from the diagonal AF, goes on diminishing both towards the end B and towards the end C. This takes place symmetrically for the red shade (FIG. 4) and according to respectively symmetrical arrangements for the other two shades (FIGS. 5 and 6). It is seen that the making of successive sheets with a different number of fibers may prove to be tricky and that the overall assembly may be difficult to achieve.

To overcome these drawbacks, one preferred approach shown in FIGS. 7 and 8, consists in using identical sheets for all three images, hence sheets having the same number of fibers each, or even in using, for the light transmission, all the fibers comprising these sheets as can be seen in the following FIGS. 9 and 10. Thus, the second end of the sheets, namely the end referred to as facing the screens, consist of a rectangular surface can be more easily integrated into the screen of the tube or the display device. Similarly, on the side of the image to be displayed, the first ends are joined in a general square A1E1C1F1, the side of which is equal to the diagonal of the image AECF to be displayed (FIG. 7). FIG. 8 shows, along the partial section aa-bb, the superimposed distribution of the sheets to form the first end and the observation plane. A support 8, such as a clamp or a frame, holds these sheets at their first end. It is realized, from the detailed FIG. 8, that when the sheets have a sufficient length available after their terminal tangling, the frame 8 can be rotated to orient the display surface AECF satisfactorily for the observation of the color image.

Figure 9:
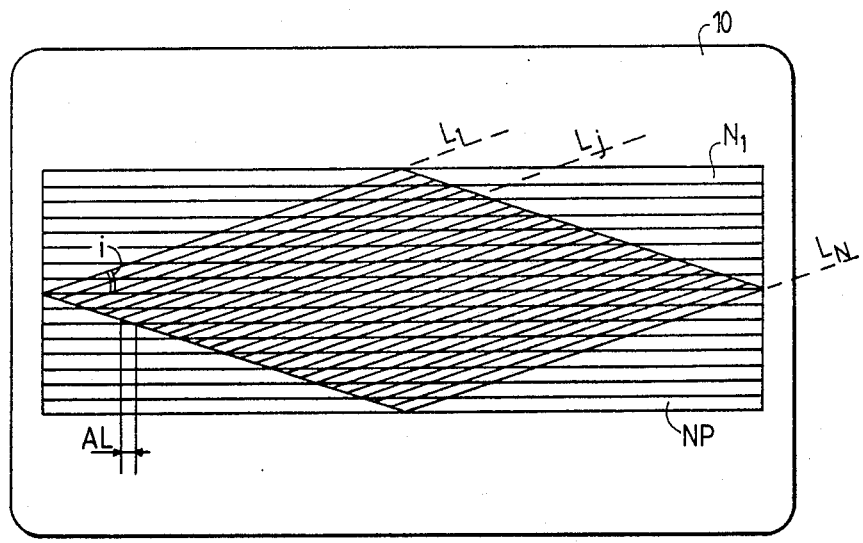
FIG. 9 is a drawing of a first assembly of the end of the sheets of one channel facing the associated screen and of the inclined line by line scanning covering the useful zone to be displayed.

FIG. 9 shows a first arrangement of sheets at their second end facing a display screen. The sheets N1 to NP are arranged in parallel to the horizontal sides of the screen, and the line by line scanning of the image is represented by the lines L1 to LN. This scanning is tilted by a certain angle "i" with respect to the directions of the sheets, and it is offset by a quantity AL at each line to cover the useful zone corresponding to the distribution of fibers (FIGS. 4, 5 and 6) designed for transmission to the plane of observation of the displayed monochrome elementary image. This useful zone is a parallelogram.

Figure 10:
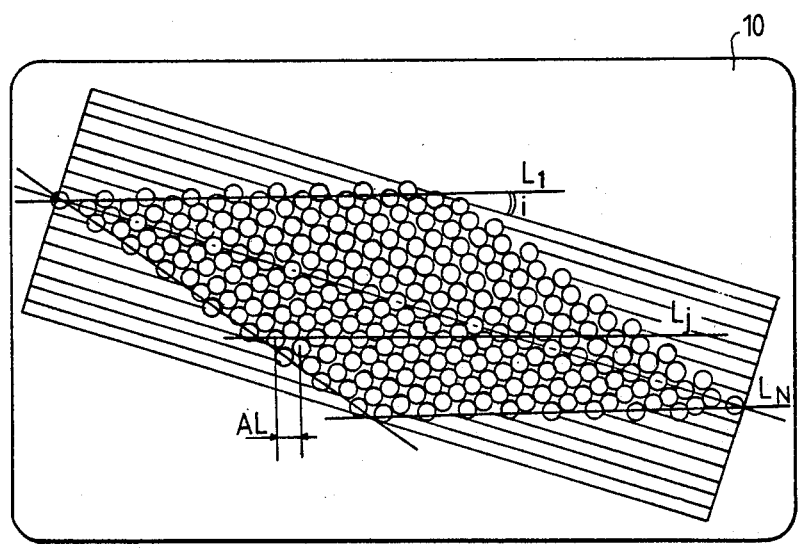
Fig. 10 is a drawing of a second assembly of the end of the sheets of a channel facing the associated screen, enabling a horizontal line by line scanning covering the useful zone to be displayed.

FIG. 10 shows a second arrangement according to which the sheets are oriented differently with respect to the sides of the display screen so as to preserve the horizontal direction for the line by line scanning L1 to LN of the image.

In the example envisaged, for making a square image with N rows of N optic fibers, the elementary images have a with N rows of N optic fibers, the elementary images have a rhomboid, one of the diagonals has N fibers or N-1 fibers and the other has 2N/3 fibers. The result thereof is that the side of the rhombus is $N \cdot \sqrt{13/36}$ which represents, the diameter and the respective arrangement of the fibers being known, represents the useful length to be scanned along each line.

Thus, with a stacking of fibers in diagonally arranged sheets, the final square image has N×N fibers in an L×L format. On the diagonal D1 of the final image, there are N fibers and each initial image has a main diagonal of N or N−1 fibers. There are 2N sheets juxtaposed along the direction D2 of the displayed image, and all the useful parts of the sheets having a variable length are addressed alternately at each other of the three images. There are therefore 2N/3 sheets of each initial image. The starting image is a parallelogram with a ratio of $\frac{2}{3}$ between the two diagonals, The initial image is produced by a television scan along the side of the parallelogram to be displayed, and it is necessary to trace $\sqrt{13/36} \cdot N$ lines of each of the $\sqrt{13/36} \cdot N$ dots, i.e. about 0.6 N lines ×0.6 N dots. The moiré effects are limited because the angle between the two main directions of the scanning and the transmission is about 33°7 in the case of a final square image. In the case of a rectangular image, the sheets will be also inclined with respect to the sides AB, CD of the rectangle.

Figure 11:
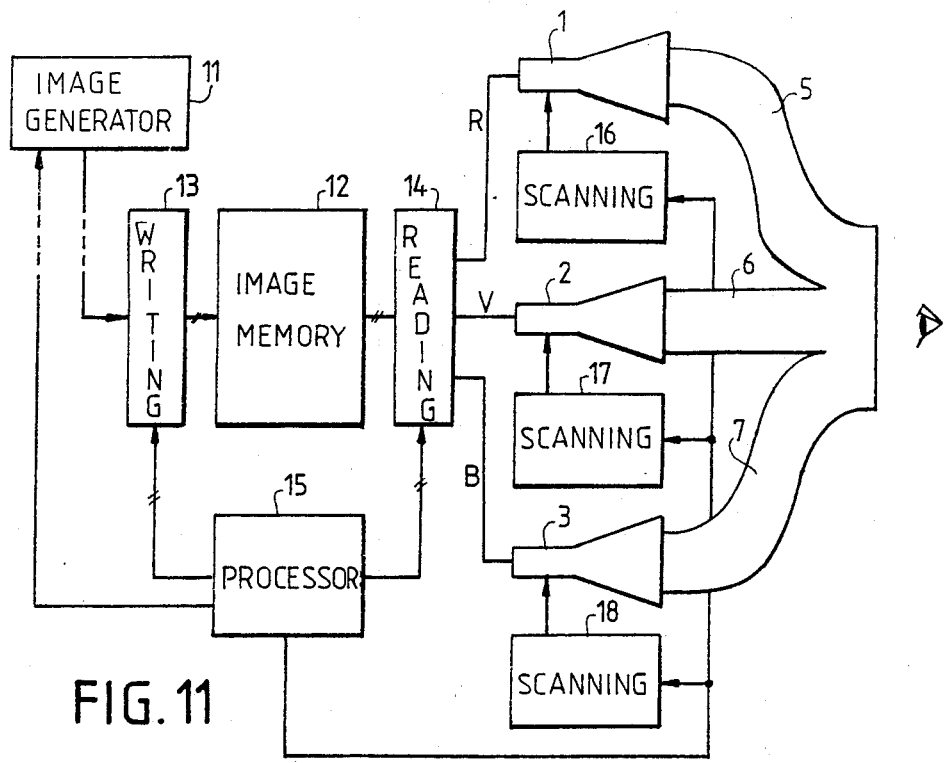
FIG. 11 is a general block of an image display system according to the invention.
Figure 2:
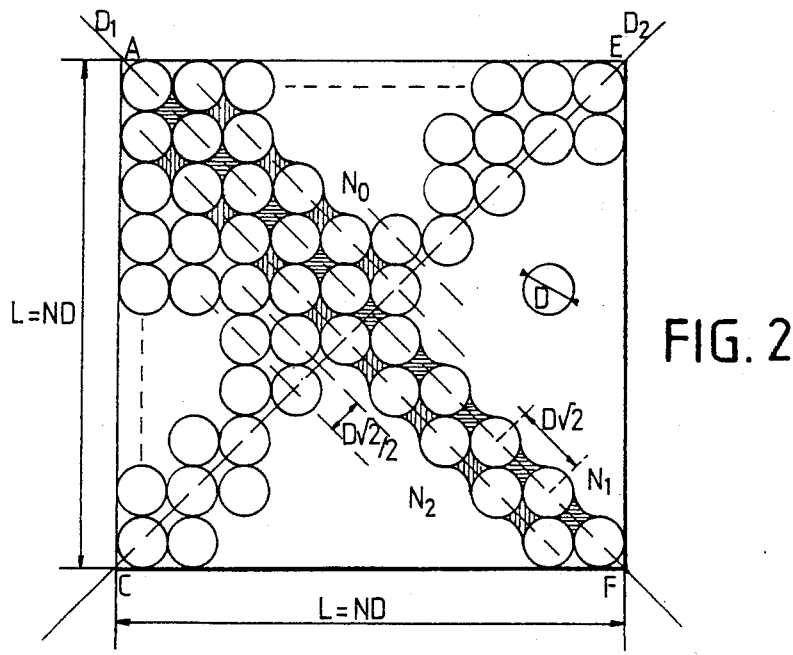
FIG. 2 is an illustration of arrangements of fibers in the plane of the displayed color image.

FIG. 11 is a simplified diagram of an image display system according to the invention where the cathode ray tubes 1, 2, and 3 and the sheets 5, 6 and 7 are again represented. The other elements indicated consist of an image generator 11 and an image memory 12 with its associated write addressing circuit 13 and read addressing circuit 14, this set being handled by a processing device 15 which also controls the scanning circuits 16, 17 and 18 of the tubes.

In the embodiment described above, notably with reference to FIGS. 4, 5 and 6 pertaining to the arrangements of the fibers at the ends of the sheets on the monochrome display screens 10, 20 and 30 side, as well as to FIGS. 9 and 10 dealing with the positioning of these ends and the corresponding line by line scanning done on the screens, it is realized that the anamorphic ratio is $\frac{1}{3}$ at its ends.

To increase this ratio and improve the described approach, the structure of the sheets is modified as follows. The optic fibers which are spaced out at the distance $D \cdot \sqrt{2}$ from one another on the display plane AECF side are gradually brought closer together and get juxtaposed beside one other at the end facing the screen. The size of the median sheet, which is the biggest one, is thus reduced in the ratio $1/\sqrt{2}$ and the corresponding dimension of the rhombus is reduced to the same extent. Along the other diagonal direction of the rhombus, corresponding to the superimposition of the sheets, these sheets, instead of being imbricated, as shown, at a very small distance $D/\sqrt{2}$ from one another, are arranged in parallel at a distance of D, whence an increase by the factor $\sqrt{2}$. Finally, the anamorphic ratio thus becomes $\frac{2}{3}$ instead of $\frac{1}{3}$.

What is claimed is:

1. A system for the display of color images comprising:
   n display devices, where n is a whole number greater than 1, respectively provided with n electronic scanning screens to form n monochrome elementary images with n distinct chrominance values, respectively on the screens, from one of said color images; and
   an optical mixing device to mix the n elementary images and form a resultant color image in a plane of observation, said mixing device being formed by optical fibers, each having a first end and a second end and being ordered to form groups of n fibers, each group having a first end and a second end, the fibers of one of said groups terminating, at said first end, at the n screens as dots of the elementary images and terminating, at said second end, in the observation plane, substantially as a dot which is the dot of the resultant image to be displayed, corresponding to the dot considered, for the group of the original image.

2. A system according to claim 1, wherein the fibers are arranged in sheets, the fibers of said sheets terminating, at said first end, at one of the n screens which one screen is the same for all the fibers of the sheet considered.

3. A system according to claim 2, wherein the original image is rectangularly shaped and wherein the orientation of the sheets at the first end of their fibers is inclined by a constant value with respect to the sides of the rectangle.

4. A system according to claim 3, wherein n=3, and the sheets are placed following one another at the second end of their fibers, according to an arrangement wherein sheets numbered such that modulo 3=x terminate respectively, at the first end of their fibers, at x of said 3 screens.

5. A system according to claim 2, wherein the sheets are identical.

6. A system according to claim 5, wherein the line by line scanning of each screen is inclined with respect to the direction of the sheets and offset from one line to the next one cover a useful zone having the shape of a parallelogram corresponding to the extent of the elementary image to be transmitted by the fibers.

7. A system according to claim 2, wherein the sheets, at the second end of their fibers, are imbricated and placed at $D/\sqrt{2}$ from one another, D being the diameter of the fibers, the fibers themselves being spaced out at $D\times\sqrt{2}$ from one another in each sheet and the sheets, at the first end of their fibers, being superimposed at a distance D from one another and the fibers being juxtaposed also at a distance D.

* * * * *